Figure 1:
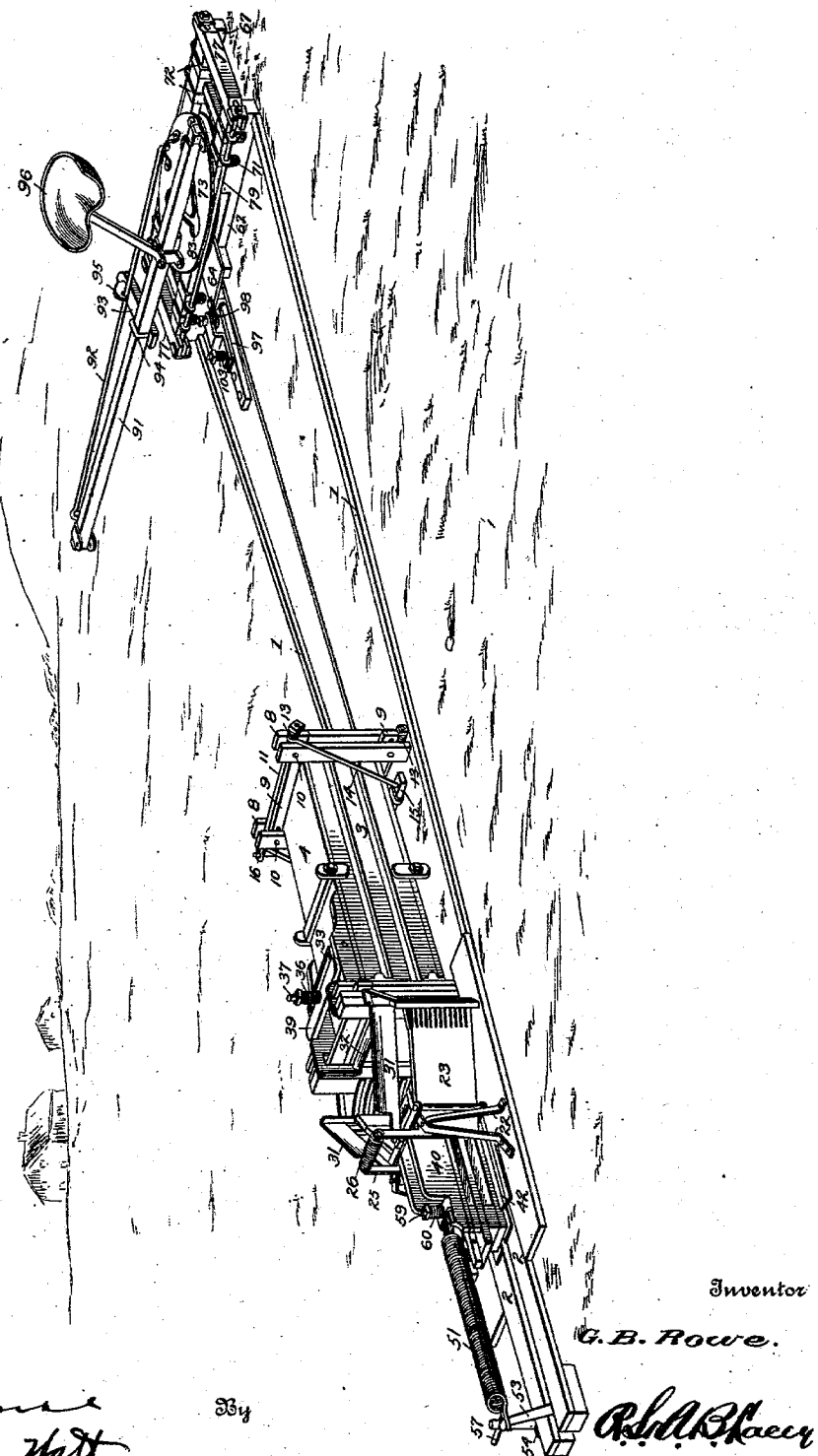

No. 757,501. PATENTED APR. 19, 1904.
G. B. ROWE.
PRESS.
APPLICATION FILED JUNE 20, 1903.
NO MODEL. 6 SHEETS—SHEET 1.

Witnesses
Jno Monroe
George G. Watt

By

Inventor
G. B. Rowe.

Attorneys

No. 757,501. PATENTED APR. 19, 1904.
G. B. ROWE.
PRESS.
APPLICATION FILED JUNE 20, 1903.
NO MODEL. 6 SHEETS—SHEET 2.
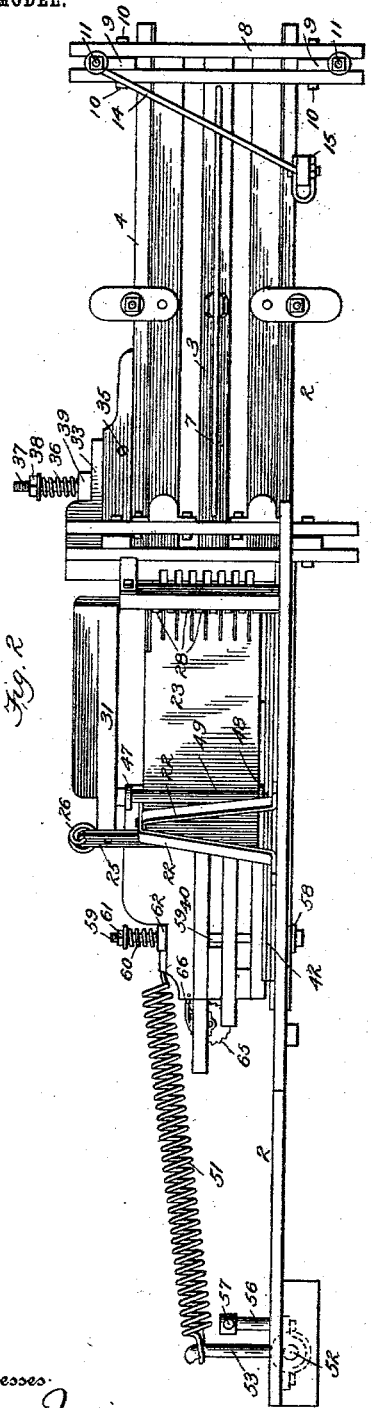
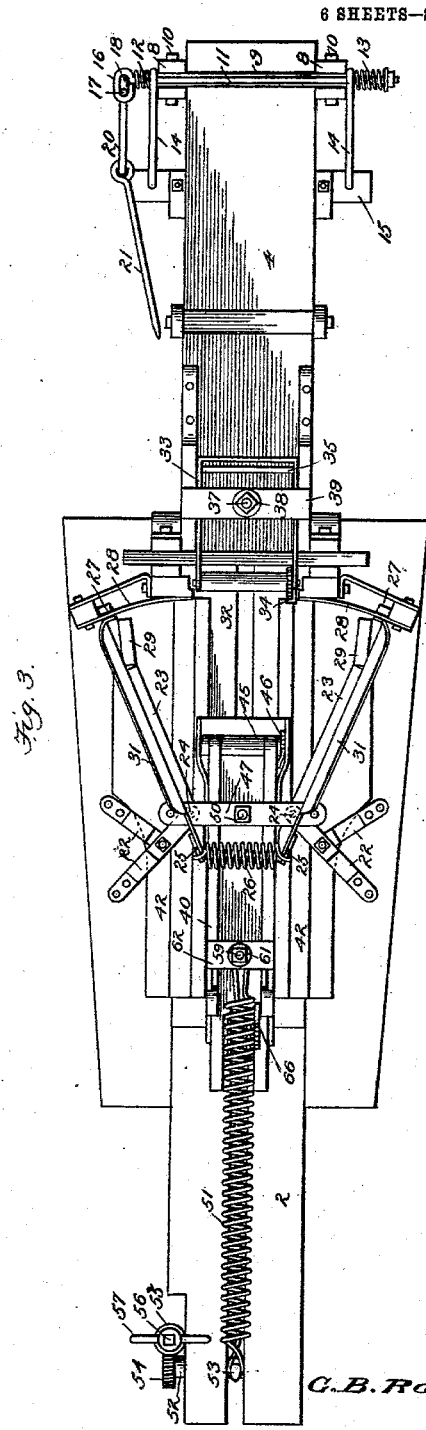
Witnesses
Inventor
G. B. Rowe.
Attorneys No. 757,501. PATENTED APR. 19, 1904.
G. B. ROWE.
PRESS.
APPLICATION FILED JUNE 20, 1903.
NO MODEL. 6 SHEETS—SHEET 3.
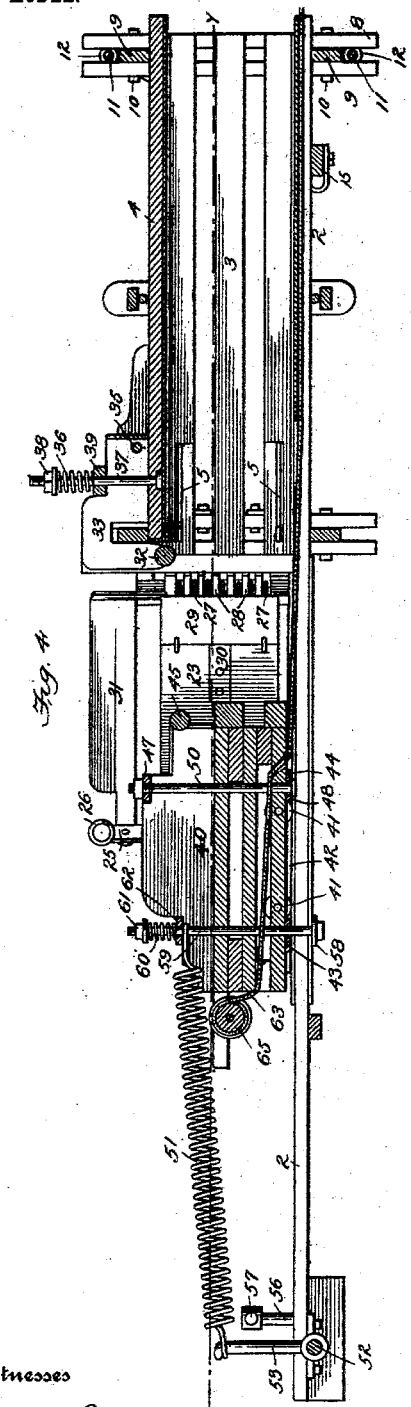
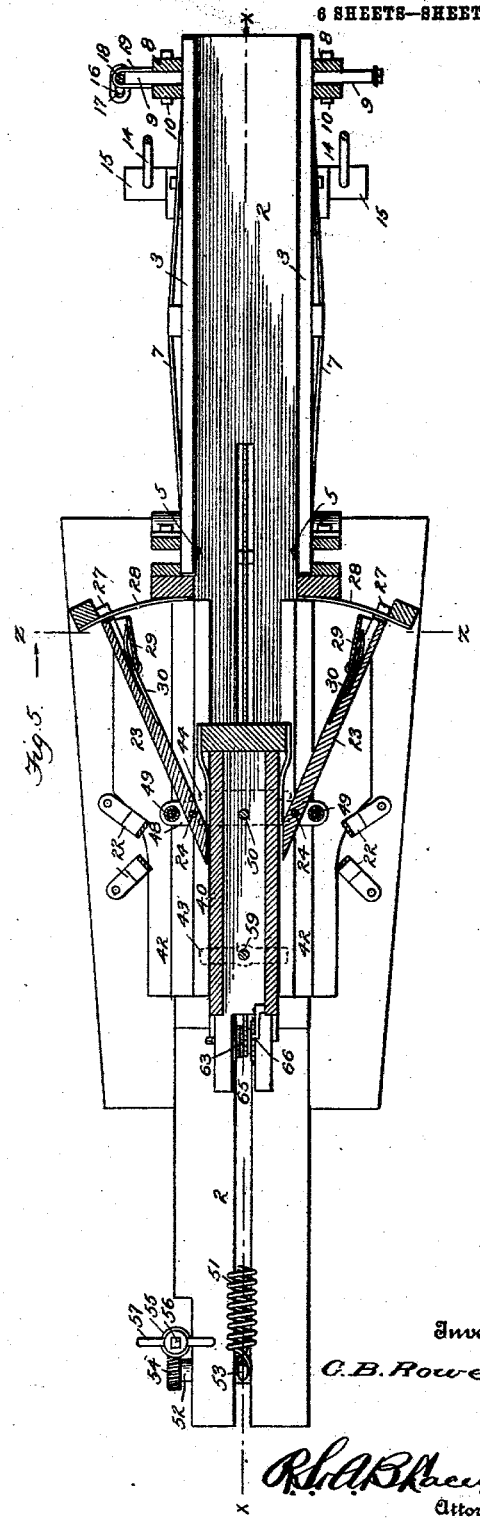
Witnesses
Inventor
G. B. Rowe.
Attorneys No. 757,501. PATENTED APR. 19, 1904.
G. B. ROWE.
PRESS.
APPLICATION FILED JUNE 20, 1903.
NO MODEL. 6 SHEETS—SHEET 4.
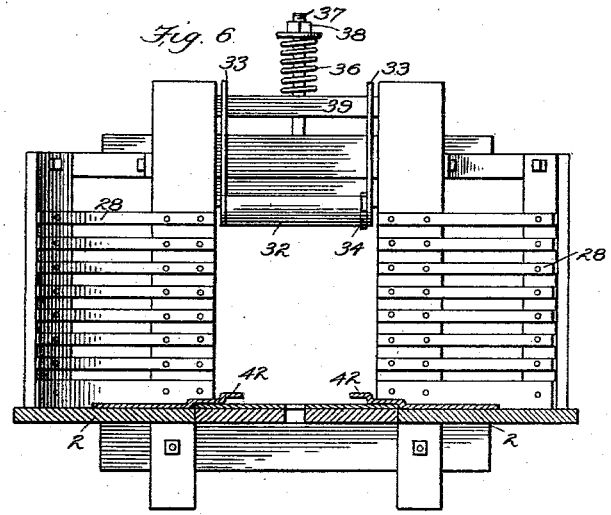
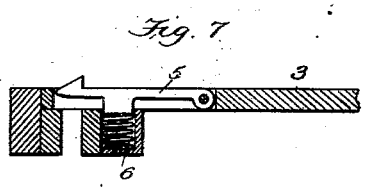
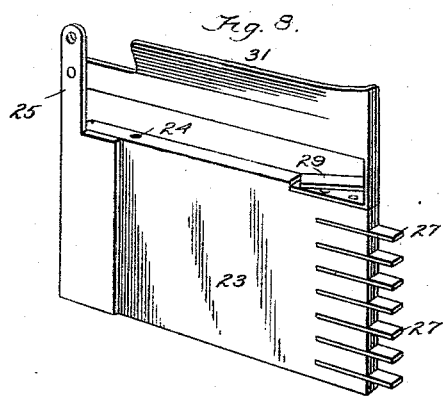
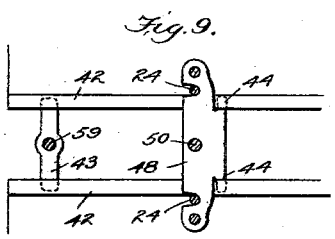
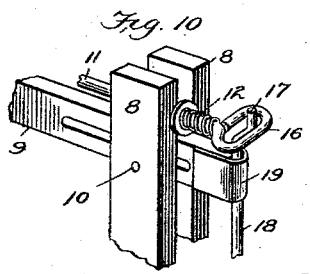
Witnesses
Inventor
C. B. Rowe.
By,
Attorneys No. 757,501. PATENTED APR. 19, 1904.
G. B. ROWE.
PRESS.
APPLICATION FILED JUNE 20, 1903.
NO MODEL. 6 SHEETS—SHEET 5.
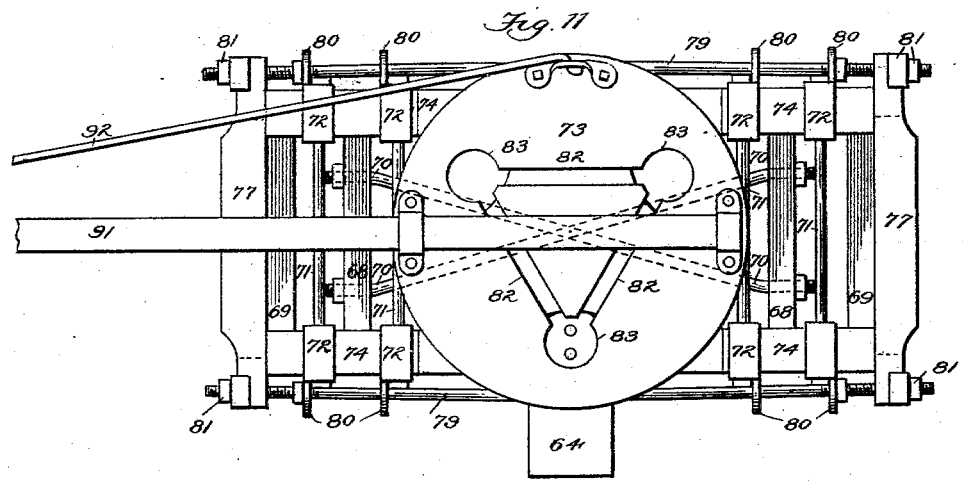
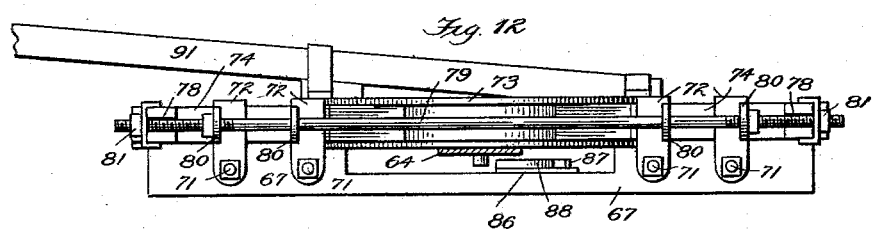
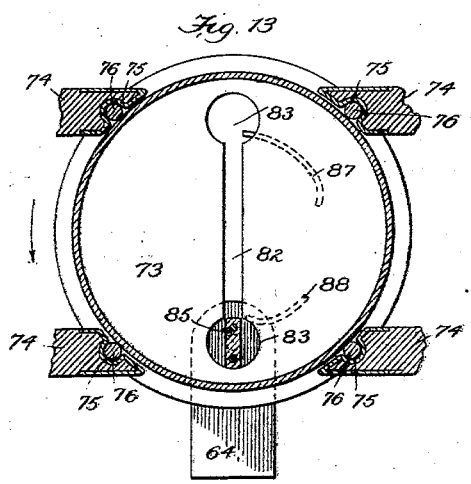 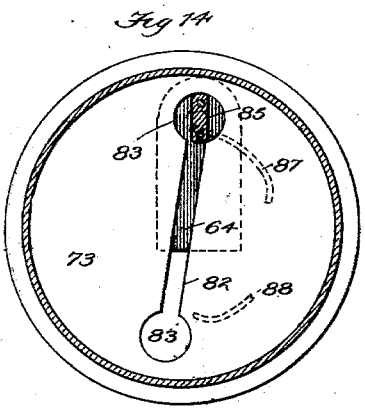
Witnesses
Inventor
G. B. Rowe.
By, Lacey, Attorneys No. 757,501. PATENTED APR. 19, 1904.
G. B. ROWE.
PRESS.
APPLICATION FILED JUNE 20, 1903.
NO MODEL. 6 SHEETS—SHEET 6.
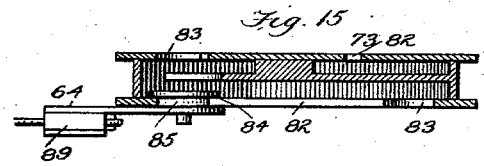
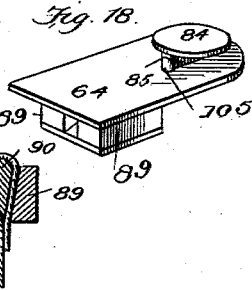
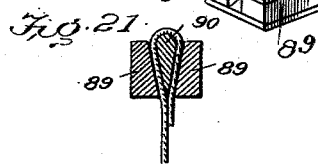
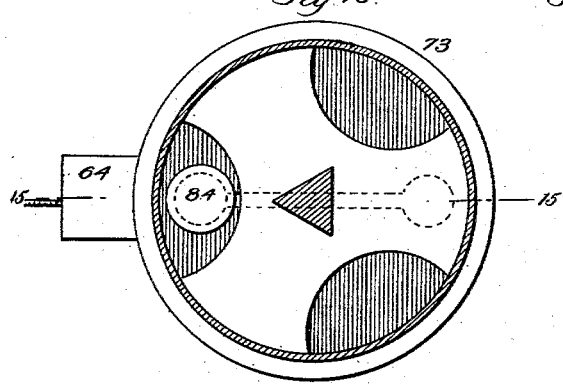
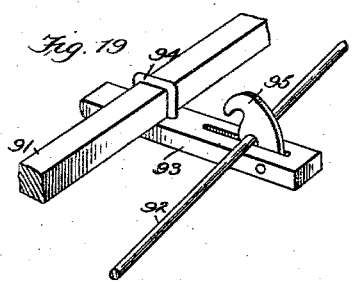
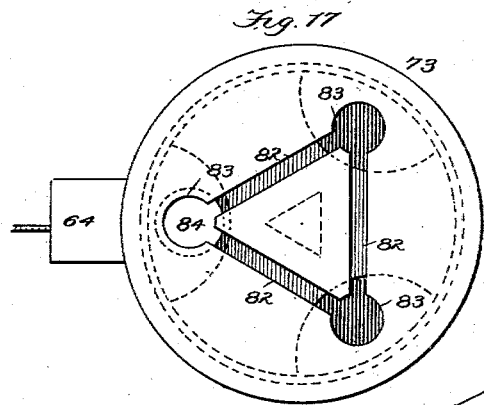
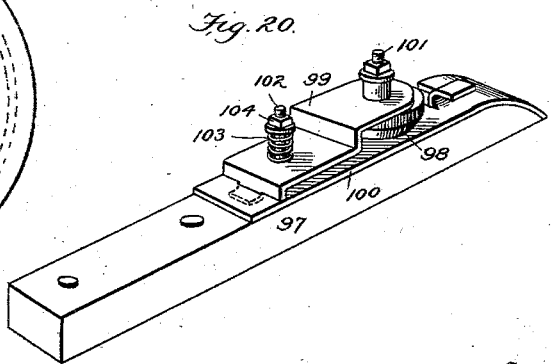
Witnesses
Inventor
G. B. Rowe.
By, Attorneys.

No. 757,501. Patented April 19, 1904.

UNITED STATES PATENT OFFICE.

GEORGE B. ROWE, OF MOORE, OKLAHOMA TERRITORY.

PRESS.

SPECIFICATION forming part of Letters Patent No. 757,501, dated April 19, 1904.

Application filed June 20, 1903. Serial No. 162,398. (No model.)

*To all whom it may concern:*

Be it known that I, GEORGE BUCHER ROWE, a citizen of the United States, residing at Moore, in the county of Cleveland and Territory of Oklahoma, have invented certain new and useful Improvements in Presses, of which the following is a specification.

This invention relates to presses of the rebounding type and which are practically continuous in operation, the density of the bale being regulated by frictional engagement thereof with the sides of the baling-chamber, said sides being adjustable to contract the outlet or discharge end of the baling-chamber to a greater or less degree. The plunger or follower is of the rebounding variety and pivoted side wings coöperate therewith, said wings when moved inward forming, in effect, continuations of the sides of the baling-chamber and when spread forming a compartment into which the loose material is adapted to be thrown from a wagon by the ordinary hayfork, thereby obviating the use of a special feeder. The power which comprises a drum and sweep is adapted to have the drum reversed to vary the strokes of the plunger during a complete revolution of the drum. In one position of the drum the plunger has imparted thereto two strokes, and the drum when reversed imparts three complete strokes to the plunger during each revolution.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a press constructed in accordance with and embodying the essential features of the invention. Fig. 2 is a side elevation of the press on a larger scale. Fig. 3 is a top plan view of the press. Fig. 4 is a central longitudinal section on the line X X of Fig. 5. Fig. 5 is a horizontal section of the press on the line Y Y of Fig. 4. Fig. 6 is a cross-section of the press on the line Z Z of Fig. 5 looking to the front as indicated by the arrows. Fig. 7 is a detail section of the inner end of the baling-chamber, showing more clearly the spring-actuated catch for holding the charges when compressed and moved forward by the plunger at each actuation thereof. Fig. 8 is a detail perspective view of one of the wings. Fig. 9 is a detail view of the guides and transverse strips for holding the plunger to the bed and directing it in its reciprocating movements. Fig. 10 is a detail perspective view of the upper end portion of the crank-shaft and the end portion of the tension-bar coöperating therewith. Fig. 11 is a top plan view of the power mechanism for operating the press, the same being shown on a larger scale. Fig. 12 is a side view of the power mechanism. Fig. 13 is a detail view of the drum as seen from the lower side, showing the draft-slide at the limit of its movement in one direction. Fig. 14 is a view similar to Fig. 13, showing the draft-slide at the limit of its movement in the opposite direction. Fig. 15 is a central section of the drum and draft-slide on the line 15 15 of Fig. 16. Fig. 16 is a top view of the drum and draft-slide, the upper head being omitted. Fig. 17 is a top plan view of the drum and draft-slide. Fig. 18 is a detail perspective view of the draft-slide. Fig. 19 is a detail perspective view of a portion of the sweep, the brace-rod therefor, and the stay connecting said parts. Fig. 20 is a detail perspective view of the means for regulating the rebound of the plunger. Fig. 21 is a detail view of the means for connecting the draft-cable to the draft-slide.

Corresponding and like parts are referred to in the following description and indicated in all the views of the drawings by the same reference characters.

The press is adapted to occupy the most convenient position, and in practice is preferably arranged horizontally upon a selected part of the ground and is staked or otherwise secured thereto, so as to resist the strain and shock incident to the peculiar character of work to be performed. The power for operating the press may be of any type and is of the variety adapted to be operated by horse and is located at a proper distance from the press and is anchored or otherwise pinned to the ground, so as to resist the load. To increase the stability of the mechanism, braces 1 are interposed between the framework of the press and power, as shown most clearly in Fig. 1.

The press comprises a bed-piece 2, sides 3, and top 4. The bed-piece 2 supports the operating parts and constitutes the lower side of the baling-chamber. The parts 4 and 3 constitute, respectively, the top and sides of the baling-chamber. Pivoted catches 5 are located at the inner or receiving end of the baling-chamber, and their hooked ends are pressed inward by springs 6, located in pockets or housings at the outer sides of the walls 3. The hooked ends of the pivoted catches 5 normally extend into the baling-chamber, so as to engage with the charges when compressed and prevent the same following the movement of the plunger when returning to a normal position. The side walls 3 are strengthened by truss-braces 7, as shown most clearly in Fig. 5. The side walls 3 of the baling-chamber are free at the inner or delivery end of the press, so as to move inward or outward, as may be required, to vary the transverse distance between the said walls 3 at the discharge end of the baling-chamber, whereby the density of the bales may be regulated. A frame encircles the inner end of the baling-chamber and comprises companion vertical bars 8 and cross-bars 9, the latter having their end portions longitudinally slotted to receive the bolts or fastenings 10, by means of which the several bars 8 and 9 are connected. The cross-bars 9 are prevented from vertical movement; but the vertical bars 8 are adapted to have a limited lateral movement to provide for transverse adjustment of the side walls 3 at the delivery end of the press. Tension-bars 11 extend transversely of the baling-chamber above and below the same and pass through the spaces formed between the end portions of vertical bars 8, projecting beyond cross-bars 9. These tension-bars are provided at opposite ends with springs 12 and 13, which exert an inward pressure upon the said vertical bars 8, thereby compressing the sides 3 at their inner ends. The springs 12 and 13 are confined between suitable stops at the outer ends of the tension-bars 11 and the vertical bars 8. The upper tension-bar is stayed by braces 14, which are connected at their lower ends to a cross-timber 15, secured to the bed-piece 2, and which are provided at their upper ends with eyes through which said tension-bar passes. These stays 14 also serve to brace the upper portion of the frame encircling the delivery end of the baling-chamber. A loop 16 is formed at one end of each of the tension-bars 11 and is adapted to receive a crank portion 17 of crank-shaft 18, journaled near its ends in bearings 19 at one end of the cross-bars 9. The crank-shaft 18 is provided intermediate of its ends with a crank 20 to facilitate turning of the crank-shaft in its bearings when it is required to move the tension-bars 11 longitudinally to admit of the sides 3 moving apart to a greater or less extent. A pin 21 is loose upon the crank portion 20 of the crank-shaft and is adapted to be engaged with a side of the baling-chamber, so as to hold the crank-shaft 18 in the required position. When the crank-shaft 18 is turned in the bearings 19, the crank portion 17 coöperates with the loops 16 and effects a longitudinal movement of the tension-bars 11, so as to vary the inward pressure of the tension-springs 12 and 13 upon the sides 3 for the purpose stated.

Standards 22 are secured at their lower ends to the bed 2 at each side thereof, and wings 23 are pivoted at their upper edges thereto and at their lower edges to the bed 2. The pivot rods or axes of the wings 23 are indicated at 24, the same being near the outer ends of the wings. An arm 25 projects upward from the outer end of each of the wings 23, and a stout coil-spring 26 connects the upper ends of the arms 25 and normally tends to draw the outer ends of the wings together, whereby their inner ends are spread apart, as indicated most clearly in Figs. 3 and 5. The inner ends of the wings are provided with teeth 27 to operate in the spaces formed between guards 28, which appear as grates and curve transversely on the arcs of circles having the axes of the respective wings 23 as centers, whereby the inner ends of the wings 23 maintain a close joint with the concave sides of the grated guards 28. By having the teeth 27 pass through the spaces formed between the bars or elements of the grated guards the material is prevented from wedging between the inner ends of the wings 23 and said guards. A plate 29 is applied to the inner side of each wing 23 near its inner end and is pivoted to the wing at its inner edge and is free at its outer edge to move toward and from the plane of the wing. A spring 30 is interposed between the pivoted plate 29 and the wing 23 and normally presses the outer or free end of the plate 29 inward. This construction provides, in effect, yielding portions at the inner or free ends of the wings 23, which are adapted to give when the wings are moving inward at their inner ends to compress the material simultaneously with the advance of the plunger to force the same into the baling-chamber, thereby obviating injurious pressure and strain upon the wings and coöperating parts. The teeth 27 preferably consist of strips let into kerfs or saw-cuts formed in the inner ends of the wings and secured therein in any manner. A guard 31 is applied to the upper edge of each wing 23, and its upper portion is outwardly deflected, whereby said guards 31 are upwardly flared to facilitate the entrance of the material into the receiving-chamber when supplying material to the press.

The grated guards 28 may be of any formation and, as shown, comprise inner and outer upright bars and transverse strips, the latter being secured at their ends in any substantial way to said upright bars. These grated guards 28 close the spaces formed between the sides of the baling-chamber and the inner ends of the wings 23 when the latter are spread, as shown most clearly in Fig. 5.

A pressure-roller 32 is located at the receiving end of the baling-chamber about in line with the upper wall 4 and is journaled at its ends in pendent portions of a pivoted frame 33. This pressure-roller 32 is adapted to turn in one direction only—that is, with the plunger and charge when the same are entering the baling-chamber—and is prevented from rotation when the plunger is returning to a normal position. A ratchet and pawl 34 coöperates with the pressure-roller 32 to admit of its turning in one direction and to prevent its rotation in the opposite direction. The frame 33 is located on top of the baling-chamber at its inner or receiving end and is pivoted at 35 and held down upon the baling-chamber by a tension-spring 36, which is mounted upon rod 37 and confined thereon between set-nut 38 and cross-bar 39. The tension of the spring 36 may be varied by moving the set-nut 38 upon the threaded end of rod 37. The lower portion of the pressure-roller 32 normally extends beyond the lower side of wall 4, and hence exerts a downward pressure upon the charge as the same is being forced into the baling-chamber, thereby compressing the same in a perpendicular direction.

The plunger or follower is indicated at 40 and may be of any construction, and as illustrated it is composed of a series of strips secured together, so as to form an open structure for the sake of lightness. The plunger or follower is slidably mounted upon the bed 2, and in order to minimize the friction it is mounted upon truck-wheels 41. In order to hold the plunger to the bed and insure its movement rectilinearly, plates 42 are secured to the top side of the bed 2, and their inner longitudinal edge portions are bent to form guides for the outer end portions of transverse strips 43 and 44 to engage under. These strips 43 and 44 are secured to the bottom side of the plunger or follower in any substantial manner. A roller 45 is journaled to the upper inner corner of the plunger and is designed to prevent binding of the plunger in the baling-chamber when compressing the bale. A ratchet and pawl 46 coöperates with the roller 45 to prevent movement thereof in one direction, but admits of it turning freely in the opposite direction. Upper and lower transverse bars 47 and 48 are secured to the upper and lower sides of the plunger or follower, and their end portions project beyond the sides of the follower and support vertical rollers 49, which embrace the outer sides of the wings 23. As the plunger or follower is moved forward the rollers 49 travel upon the outer sides of the wings 23 and move the same inward, thereby compressing the charge laterally and causing said wings to aline with the sides 3 of the baling-chamber and form, in effect, continuations thereof. The cross-bars 47 and 48 may be connected to the plunger in any substantial way, and, as shown, a bolt 50 is passed through coincident openings in said cross-bars and the plunger, thereby admitting of separation of the parts when desired for any purpose. The plunger or follower is returned to a normal position by means of spring 51, which is connected at one end to the plunger and has adjustable connection at its opposite end to the bed 2, whereby the tension of the spring may be varied to cause the follower to return at a greater or less speed. A shaft 52 is journaled transversely of the bed 2, and an arm 53 projects upward therefrom, the end of the spring 51 being connected thereto. By turning the shaft 52 the tension of the spring 51 may be varied. To effect turning of the shaft 52, it is provided upon its outer end with worm-gear 54 in mesh with worm-thread 55 of vertical shaft 56, the head of which is apertured to receive operating-bar 57. The movement of the plunger is controlled in a measure by a regulator, the same consisting of a shoe 58, vertical rod 59, and tension-spring 60, the latter being mounted upon the upper end of the rod 59 and confined between set-nut 61 and cross-piece 62. The spring 60 exerts an upward pressure on the rod 59, thereby pressing the shoe 58 against the under side of the bed 2 with a friction depending upon the tension of the spring 60, so as to offer greater or less resistance to the return movement of the plunger under the action of the spring 51.

The draft rope or cable 63 is connected at one end to the draft-slide 64 and has adjustable connection at its opposite end with the plunger, so as to allow for variation in the distance between the press and its operating power when setting up the same. For convenience a windlass 65 is applied to the outer end of the plunger, and one end of the draft rope or cable 63 is secured thereto and the loose end portion adapted to wind thereon. A ratchet and pawl 66 coöperates with the windlass to prevent unwinding of the rope 63 therefrom when the parts are properly adjusted. The draft rope or cable passes beneath the baling-chamber, thence upward through a slot in the bed 2 to the windlass 65. This slot also provides a passage for the lower end of the rod 59.

The horse-power comprises a frame and a drum, the frame consisting of transverse sills 67 and longitudinal sills 68 and 69, the same being rigidly connected at their meeting ends. Transverse braces 70 stiffen the frame and secure the parts against any play or movement, and their end portions are threaded and passed through openings in the longitudinal sills 68. Tie-rods 71 connect the transverse sills 67 and also pass through openings in the legs of keepers 72, so as to hold them firmly in place. The drum 73 is rotatably mounted upon the frame and is grooved in its periphery and is held in place by four bars 74, slidably mounted in the keepers 72 and having their inner ends snugly fitted into the grooved edge of the drum. The inner ends of the bars 74 are notched to form seats 75, in which are fitted rollers 76, so as to reduce the frictional contact of the inner ends of said bars with the drum to the smallest amount possible. The bars 74 are held in place and adjusted by means of clamp-bars 77, the end portions of which are longitudinally slotted, as shown at 78, to receive the threaded ends of tie-rods 79, which pass through apertured ears 80, projected outward from the keepers 72. By having the end portions of the clamp-bars 77 longitudinally slotted they may be readily disconnected from the tie-rods 79 by loosening clamp-nuts 81 to admit of the bars 74 being moved outward, so as to release the drum 73 to admit of its reversal or substitution by means of another drum. The tie-rods 79 enter the grooved edge of the drum 73 and supplement the action of the bars 74 in holding the drum in place. The drum may be of any substantial construction and as shown is composed of upper and lower heads and an intermediate plate. Straight slots or guides 82 are formed in the heads of the drum and terminate in circular enlargements 83. If the drum is designed to impart two complete movements to the plunger during each complete revolution, the slot 82 is diametrically arranged, as shown in Figs. 13 and 14. For imparting three complete strokes to the plunger or follower during a complete revolution of the drum the latter is provided with three slots 82, having a triangular arrangement, as shown most clearly in Figs. 11 and 17, the circular enlargements being at the angles formed by the juncture of the slots. In order that a drum may be adapted for a twofold purpose, one head or side is provided with a single slot and the other head or side with a plurality of slots.

The draft-slide 64 is provided at one end with a head 84 and flat shank 85, the latter adapted to travel in the straight slot 82. The head 84 is slightly larger than the openings 83 at the extremities of the slot 82, so as to hold the draft-slide in place. The flat shank 85 is of a length to admit of the draft-slide turning in either one of the openings 83, whereby provision is had for reversing the slide at each end of the slot and at each half-revolution of the drum. A plate 86 is secured to the frame of the horse-power and is provided with upwardly-extended cams 87 and 88, which coöperate with the shank 85 of the draft-slide to hold the same in place when turning at each end of the slot or guide 82.

For connecting the draft rope or cable 63 to the draft-slide 64 spaced lugs 89 are applied to the draft-slide or formed therewith, and a wedge-shaped space is formed between their opposing sides for coöperation with a wedge 90, which is inserted in a fold or bight of the rope or cable 63. This manner of connecting the draft-cable to the draft-slide admits of ready adjustment and also prevents injury to the connection.

The sweep 91 is connected to the drum in such a manner as to admit of its ready detachment when the drum is to be reversed or the power to be stored. A brace-rod 92 connects the outer end of the sweep with the drum, and a stay 93 connects the parts 91 and 92 at a point intermediate of their ends, a clip 94 connecting the stay with the sweep and a toothed dog 95 connecting said stay with the brace-rod 92. A seat 96 is applied to the sweep for convenience of the driver.

The press and its operating power being arranged substantially as set forth and the sweep being rotated in the accustomed manner, the plunger or follower is alternately advanced and retracted. The return of the plunger is brought about by means of the spring 51, and its advance is accomplished by means of the eccentric movement of the draft-slide with the drum when the latter is rotated. When the slot 82 of the drum alines with the direction of strain upon the draft rope or cable 63, the draft-slide assumes a position with its flat shank 85 in line with the slot or guide 82, thereby permitting the slide to move from the side of the drum remote from the press to the side or edge portion nearest the press. At this time the plunger or follower is returned to a normal position by the spring 51. To prevent a too quick movement of the plunger and draft-slide, the check or regulator comprising the following parts has been devised: A block 97 is located adjacent to the frame of the power and is provided with a pulley 98, having its lower portion of conical form. This pulley 98 is mounted between plates 99 and 100, secured to the block 97. A pin or bolt 101 passes through openings of the block 97 and plates 99 and 100, and the pulley 98 is mounted thereon. Clamp-bolt 102 is let into the block 97 and is provided with tension-spring 103, which exerts a downward pressure upon the plate 99. By turning the set-nut 104 the tension of spring 103 may be regulated, thereby causing the pulley 98 to be clamped between plates 99 and 100 with a greater or less pressure. At or about the instant the plunger reaches the limit of its forward movement into the baling-chamber the draft rope or cable strikes the inclined portion of the pulley 98 and is caused to pass between said pulley and the plate 100, whereby the draft rope or cable is subjected to tension which modifies the return stroke of the draft-slide and plunger, the latter being further controlled by means of the shoe 58 in the manner stated. When the plunger is in a normal position and the inner ends of the wings 23 spread, the space formed between said wings, plunger, and guards 28 constitutes a chamber into which the material to be baled is supplied by being thrown therein from the wagon. When the plunger is moved forward, the wings 23 are simultaneously moved inward, thereby compressing the material laterally and longitudinally. The several bales may be separated by spacing-blocks in the usual way, the operation of the press being practically continuous, as will be readily comprehended.

To facilitate the turning of the draft-slide at the ends of the slots, a roller 105 is arranged at the end of the shank 85 facing the press, so as to sustain the strain.

Having thus described the invention, what is claimed as new is—

1. In a press, the combination of a baling-chamber, a laterally-movable wing, a plunger, means for positively moving the wing laterally in each direction, and a guard closing the space between the end of the baling-chamber and the corresponding end of the said wing, substantially as set forth.

2. In a press, the combination of a baling-chamber, a laterally-movable wing, a plunger, means for positively moving the wing laterally in each direction, a guard closing the space between the end of the baling-chamber and the corresponding end of the said wing, said guard comprising spaced elements and projections applied to the wing to operate between the spaced elements of the guard, substantially as set forth.

3. In a press, the combination of a baling-chamber, a laterally-movable wing, teeth projected from the end of the wing, a reciprocating plunger, means for positively moving the said wing, and a grated guard closing the space formed between the end of the baling-chamber and the adjacent end of the wing and receiving the teeth of said wing between the elements or bars, substantially as described.

4. In a press, the combination of a baling-chamber, a pivoted wing, teeth projected from the end of the wing, a plunger, means for positively moving the wing laterally at its free end, and a grated guard for closing the space between the end of the baling-chamber and the wing and curved on the arc of a circle having the axis of the pivoted wing for its center, the spaces between the bars or elements of the guard receiving the teeth of the wing, substantially as specified.

5. In a press, the combination of a baling-chamber, a plunger, a laterally-movable wing, and a plate yieldingly connected to the end portion of the wing adjacent to the baling-chamber, substantially as set forth.

6. In a press, the combination of a baling-chamber, a reciprocating plunger, laterally-movable wings closing the space formed between the plunger and receiving end of the baling-chamber, means for normally holding said wings separated, and a connection between said wings and the plunger for drawing the wings inward as the plunger advances, substantially as specified.

7. In a press, the combination of a baling-chamber, a reciprocating plunger, oppositely-disposed wings pivoted at a point between their ends, a spring for drawing the outer ends of the wings together and spreading the end portions adjacent to the baling-chamber, and a connection movable with the plunger for drawing the inner ends of the wings together as the plunger advances, substantially as described.

8. In a press, the combination of a baling-chamber, a reciprocating plunger, laterally-movable wings, and guards applied to the upper edges of the wings and upwardly flared, substantially as set forth.

9. In a press, the combination of the baling-chamber, a reciprocating plunger, oppositely-disposed pivoted wings, means for normally spreading the wings at the end adjacent to the baling-chamber, and rollers connected with the plunger and movable therewith and adapted to travel upon the outer sides of the wings and draw the latter inward as the plunger advances, substantially as described.

10. In a press, the combination of a baling-chamber, a reciprocating plunger, oppositely-disposed pivoted wings, teeth projected from the inner ends of the wings, and grated guards projected from the sides of the baling-chamber to close the space formed between the receiving end of said chamber and the contiguous ends of the wings, the spaces formed between the bars or elements of the guards receiving the teeth of said wings, substantially as described.

11. In a press, and in combination with the baling-chamber and reciprocating plunger, a roller located at the receiving end of the baling-chamber, a frame arranged upon the baling-chamber and pivoted at one end thereto and having spaced pendent portions at the opposite end in which the said roller is journaled, a cross-bar, a threaded rod passed through the cross-bar, a tension-spring mounted upon the threaded rod, a set-nut for confining the tension-spring and exerting a pressure upon the said pivoted frame, and a ratchet mechanism between the pivoted frame and roller to prevent turning of the latter in one direction, substantially as specified.

12. In a press, the combination of the baling-chamber, a rebounding plunger, a rod loosely mounted in the plunger, a shoe carried by said rod and adapted to engage with a portion of the press, and a spring exerting a pressure upon said rod to cause the shoe to engage with the press to offer a greater or less resistance to the movement of the plunger, substantially as set forth.

13. In a press, the combination of the baling-chamber, a reciprocating plunger, a spring for effecting a return of the plunger, connected at one end to the plunger, a shaft having an arm to the outer end of which the opposite end of the spring is attached, an operating-shaft, and worm-gearing between the two shafts, substantially as described.

14. In a press, the combination with the baling-chamber having opposite walls movable at the delivery end, a plunger arranged to operate in the baling-chamber, bars arranged to bear against the movable sides of the baling-chamber, tension-bars coöperating with the aforesaid bars, springs mounted thereon, a shaft having crank portions to effect longitudinal movement of the tension-bars to cause the springs mounted thereon to exert a greater or less pressure upon the bars bearing against the movable sides of the baling-chamber, and means for securing said shaft in an adjusted position, substantially as set forth.

15. In a press, the combination with the baling-chamber having opposite walls movable at the delivery end, a plunger arranged to operate in the baling-chamber, bars arranged to bear against the movable sides of the baling-chamber, tension-bars coöperating with the aforesaid bars, springs mounted thereon, a shaft having crank portions to effect longitudinal movement of the tension-bars to cause the springs mounted thereon to exert a greater or less pressure upon the bars bearing against the movable sides of the baling-chamber, said shaft having an operating-crank to effect turning thereof, and a pin loosely mounted upon said operating-crank for securing it and the shaft in an adjusted position, substantially as set forth.

16. In combination, a baling-chamber, a reciprocating plunger, a power mechanism, a flexible connection between said plunger and power mechanism, and a windlass applied to the plunger for varying the length of the connection between the plunger and power mechanism, substantially as set forth.

17. In a press, and in combination with the baling-chamber and reciprocating plunger, a power mechanism comprising a drum provided with a straight slot and enlargements at the ends of said slot, and a draft-slide having a flattened portion to travel in said slot and prevent turning of the slide relative to the slot when moving in the straight portion thereof and adapted to turn in the end enlargements thereof, substantially as set forth.

18. In a press, and in combination with the baling-chamber and reciprocating plunger, a power mechanism comprising a drum provided with a straight slot and enlargements at the ends of said slot, a draft-slide having a flattened portion to travel in said slot and to turn in the end enlargements thereof, and cams for coöperating with said flattened portion of the draft-slide to effect proper turning thereof at the end of its movement in each direction, substantially as set forth.

19. In a press, and in combination with the baling-chamber and reciprocating plunger, a power mechanism comprising a drum having a plurality of intersecting straight slots having enlargements at their points of intersection, and a draft-slide having a flattened portion to successively travel in the straight slots and to turn in the enlargements at the intersections thereof, substantially as described.

20. In a press, and in combination with the baling-chamber and reciprocating plunger, a power mechanism comprising a drum having in one side a plurality of intersecting straight slots provided with enlargements at their points of intersection and having a single straight slot at the opposite side provided at its ends with enlargements, and a draft-slide adapted to coöperate with the slots in either side of the drum according as it may be required to impart two or more complete strokes to the plunger during a single revolution of the drum, substantially as set forth.

21. In a press, the combination with the baling-chamber, reciprocating plunger, spring for returning the plunger to a normal position and operating means for advancing the plunger to its work, of means for preventing a too rapid return of the plunger, the same consisting of a pulley, plates forming a mounting therefor, and a spring for causing the plates to grip the pulley with a greater or less force, substantially as described.

In testimony whereof I affix my signature in presence of two witnesses.

GEORGE B. ROWE. [L. S.]

Witnesses:
 MINNIE PAYNE,
 JOSEPH T. MUIR.